United States Patent [19]

Miyoshi et al.

[11] Patent Number: 4,654,004
[45] Date of Patent: Mar. 31, 1987

[54] CONTROLLER FOR CLINKER COOLER

[75] Inventors: Teturo Miyoshi, Chiba; Toshiaki Yokoshita, Tokyo, both of Japan

[73] Assignee: Onoda Cement Company, Ltd., Onoda, Japan

[21] Appl. No.: 802,530

[22] Filed: Nov. 27, 1985

[51] Int. Cl.$^4$ ............................................. F27D 15/02
[52] U.S. Cl. ........................................ 432/80; 34/164
[58] Field of Search ............................ 34/164; 432/80; 110/165 R

[56] References Cited

U.S. PATENT DOCUMENTS 3,112,186  11/1963  Davis et al. ................... 34/164 X
3,704,525  12/1972  Devel ........................... 34/164
3,824,069  7/1974   Brachthauser et al. ........... 432/80

Primary Examiner—Edward G. Favors
Attorney, Agent, or Firm—Tilton, Fallon, Lungmus & Chestnut

[57] ABSTRACT

A controller for a clinker cooler for cooling high temperature clinker supplied from a rotary kiln by controlling the quantity of high temperature clinker cooling air at a constant value comprising maintaining the pressure at the rear side of a baffle plate mounted in the cooler constant by varying the opening of a damper of a cooler exhaust fan and the rotating speed of the cooler exhaust fan, and controlling the pressure of a kiln outlet hood by the quantity of clinker cooling air of the all air chambers of the cooler except for the first chamber on the kiln side of the baffle plate. Thus, the variations in the cooler exhaust amount and the secondary air flow rate occurring in the prior-art control means are reduced to stabilize the steps, to improve the quality of the clinker and to reduce the thermal quantity consumption per unit.

6 Claims, 4 Drawing Figures ent invention, a pressure detector 31 for detecting the
CONTROLLER FOR CLINKER COOLER

BACKGROUND OF THE INVENTION

The present invention relates to a controller of a clinker cooler used for cement production such as a cement clinker.

Heretofore, in devices for burning raw meal of cement such as cement clinker, an air quenching cooler (heretofore referred to as "a cooler") has been used in the quick cooling of red-hot clinker burnt in a rotary kiln through thermal exchange with cooling air blown from below an oscillating grate upon which the clinker is moved, the cooling air is heated through the thermal exchanged with the high temperature clinker in the cooler and it is partly used as combustion air of a kiln and a furnace in the preheater, with the excessive air being exhausted out of the cooler.

As such a cooler, that is cooler 2 as shown in FIG. 2, is in general a grate type air quenching cooler for cooling a clinker 10 by dropping a red-hot clinker 10 on a lattice-like grate 3, blowing air by fans 14, 15, 16 and 17 from the lower portion of the perforated plate 3 while moving the clinker 10 by reciprocating the grate 3. In such a grate type air quenching cooler, the cooling air which has been thermally exchanged with the red-hot clinker 10 is thermally recovered as the secondary air for the kiln and the burning furnace in the preheater, and the excessive air is exhausted out of the cooler by an exhaust fan 22.

Further, as a method of introducing stabilized kiln secondary air, in such a clinker cooler device, a method of operating the rotating speed of the cooler exhaust fan or the opening of a damper 23 has been previously adapted to make the pressure of a hood 11 in the outlet of the kiln constant.

However, the abovementioned method of controlling the clinker cooler has the following disadvantages. The pressure in the kiln outlet hood 11 varies in accordance with the variation in the rotating speed of the kiln exhaust gas fan, the variation in the ventilating resistance resulting from the variations in the coating of raw material in side the kiln 1 and/or the variations in the secondary air temperature of the kiln. When the rotating speed of the cooler exhaust fan 22 or the opening of the damper 23 are varied so as to maintain the pressure constant in the hood 11, the quantity of the air exhausted from the cooler 2 changes in response to the above mentioned. Since the total quantity of the clinker cooling air thus introduced into the cooler 2 is maintained at a constant value and the secondary air for the furnace in the preheater is also controlled to be a constant value, the variation in the amount of air thus exhausted from the cooler 2 is relative to the variation in the quantity of the secondary air of the kiln.

Recently, as a baffle plate 13 has been hung over the clinker layer in the cooler 1, in order to stabilize the introduction of the secondary air for the kiln and the furnace in preheater and to reduce the radiation heat loss from the red-hot clinker 10, the ventilating resistance over the clinker layer increases causing a decrease in the response velocity in variations in the rotating speed of the cooler exhaust fan 22 and in variations in the pressure of the hood 11 at the outlet of the kiln 1 with respect to the variations in the opening of the fan damper 23. Therefore, the amount of variation in the cooler exhaust air increases or an alteration in the quantity of the secondary air of the kiln increases. Consequently, there are not only such disadvantages that the burning state of fuel in the kiln 1 changes and the quality of the clinker to be burnt is decreased, but the fuel consumption of the system also increases.

SUMMARY OF THE INVENTION

The present invention has been made in order to eliminate the disadvantages of the prior-art controller as mentioned above, and is for its object to provide a controller for a clinker cooler for cooling a high temperature clinker supplied from a rotary kiln by controlling the quantity of high temperature clinker cooling air at a constant value comprising maintaining the pressure at the rear side of a baffle plate mounted in the cooler constant by varying the opening of a damper of a cooler exhaust fan and the rotating speed of the cooler exhaust fan, and controlling the pressure in a hood in the outlet of the kiln according to the quantity of clinker cooling air of all the cooler air chambers except the first chamber on the kiln side of the baffle plate.

DESCRIPTION OF THE PREFERRED EMBODIMENTS

Figure 1:
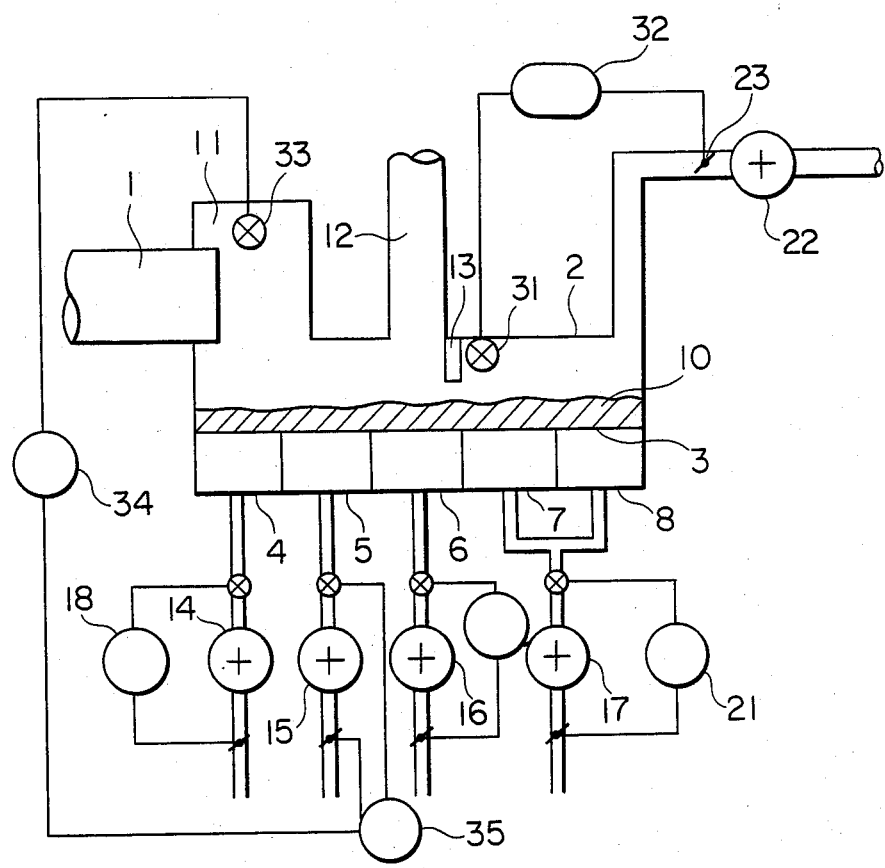
FIG. 1 is a schematic explanatory view of a controller for a clinker cooler according to an embodiment of the present invention.
Figure 2:
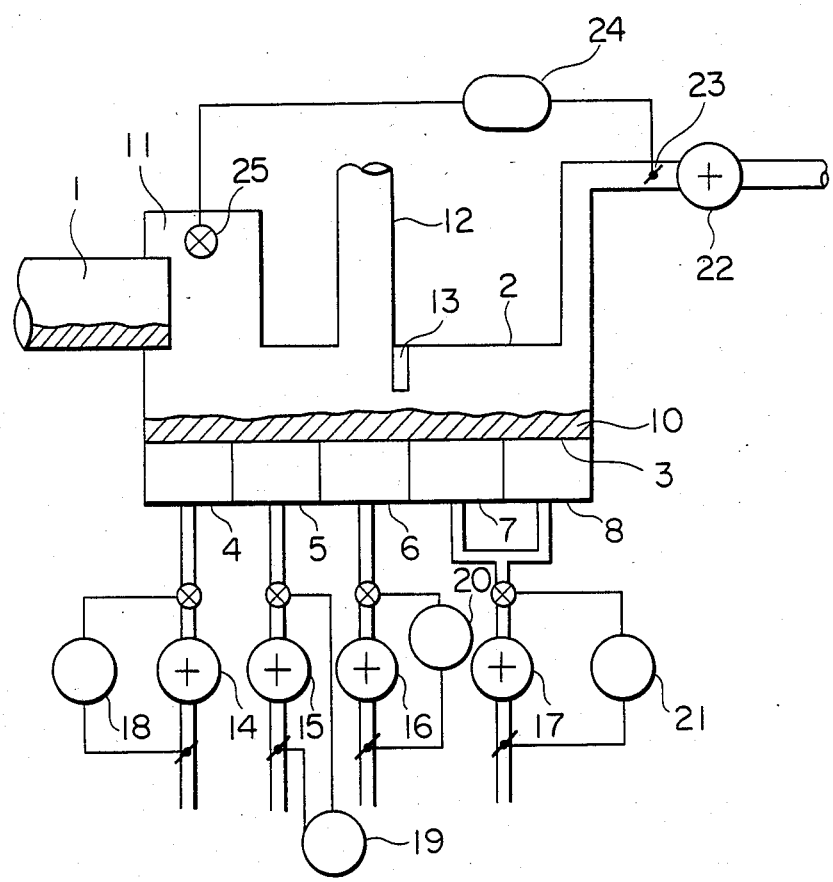
FIG. 2 is a schematic explanatory view of a controller for a prior-art clinker cooler.

FIG. 1 shows a controller for a clinker cooler according to an embodiment of the present invention, wherein the corresponding parts are denoted by the same symbols as those in FIG. 2. As shown in FIG. 1, in the controller for the clinker cooler according to the present invention, a pressure detector 31 for detecting the pressure is provided at the rear side of a baffle plate 13, and is connected through a pressure regulator 32 to a damper 23 for a cooler exhaust fan, the value detected by the pressure detector 31 being input to the pressure regulator 32, and the output of the pressure regulator 32 being input to the damper 23. Therefore, if there is a deviation between the set pressure of the pressure regulator 32 and the actual pressure at the rear side of the baffle plate 13, the damper 23 for the cooler exhaust fan is opened or closed so as to eliminate the deviation to maintain the pressure at the rear side of the baffle plate 13 constant. On the other hand, a pressure detector 33 for detecting the pressure of the kiln outlet hood 11 is provided in the hood 11, and is connected through a pressure regulator 34 to a cooling air flow regulator 35 for a cooler chamber 5, the value detected by the pressure detector 33 being input to the pressure regulator 34, and the output of the pressure regulator 34 being input to the cooling air flow regulator 35. Thus, when a deviation occurs between the set pressure of the pressure regulator 34 of the hood 11 and the actual pressure in the hood 11, the set air flow value of the cooling air flow regulator 35 of the cooler chamber 5 is altered in response to the magnitude of the deviation to increase or decrease the cooling air flow of the cooler chamber 5, thereby maintaining the pressure in the hood constant. Therefore, when the pressure in the kiln outlet hood 11, for example, increases as compared with the set pressure, the cooling air flow in the cooler chamber 5 is decreased to reduce the pressure over the clinker layer in the cooler, thereby maintaining the pressure in the kiln outlet hood 11 constnt.

When the controller for the clinker cooler is constructed according to the present invention as described above and as shown in the drawings, the pressure at the rear side of the baffle plate 13 over the clinker layer in the cooler having a fast response speed can be maintained constant by altering the rotating speed of the cooler exhaust fan 22 and the opening of the damper 23, while the pressure in the kiln outlet hood 11 can be maintained constant by altering the clinker cooling air flow of the chambers 5, 6, 7 and 8, excepting the cooler chamber 4 at the kiln 1 side of the baffle plate 13. Thus, the variation in the amount of cooler exhaust for maintaining the pressure at the rear side of the baffle plate 13 constant may be small, and the cause of variations in the pressure in the kiln outlet hood 11 which occur in the cooler 2 can be preliminarily excluded as a minor loop operation. Therefore, the pressure in the kiln outlet hood can be controlled by the clinker cooling air flow, the variation in the secondary air flow of the kiln can be reduced as compared with the prior-art controlling method, and the variation in the pressure in the hood of the outlet of the kiln can be reduced under satisfactory control.

Figure 3:
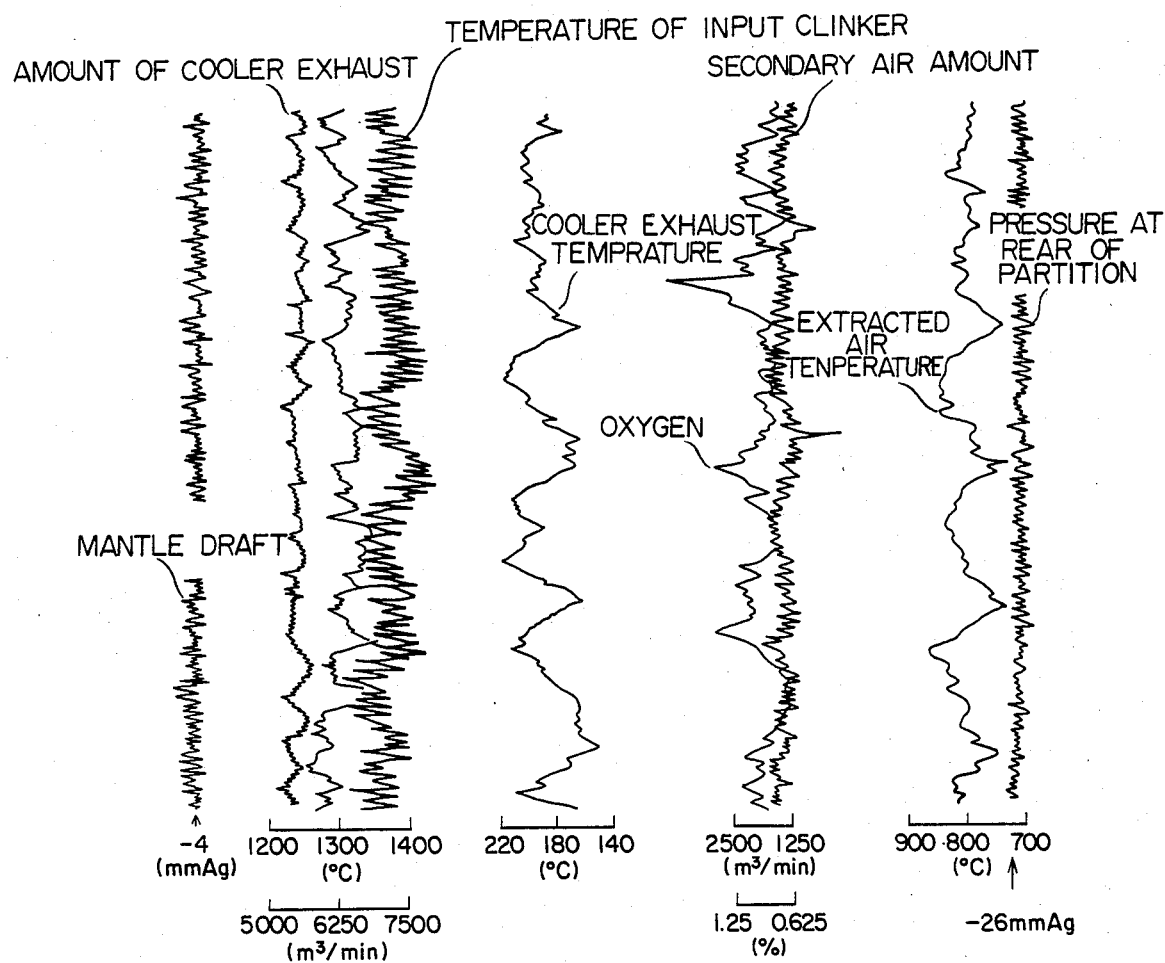
FIG. 3 is a diagram showing the variable states of temperature, pressure and air flow of the sections of the cooler under the control of the present invention.
Figure 4:
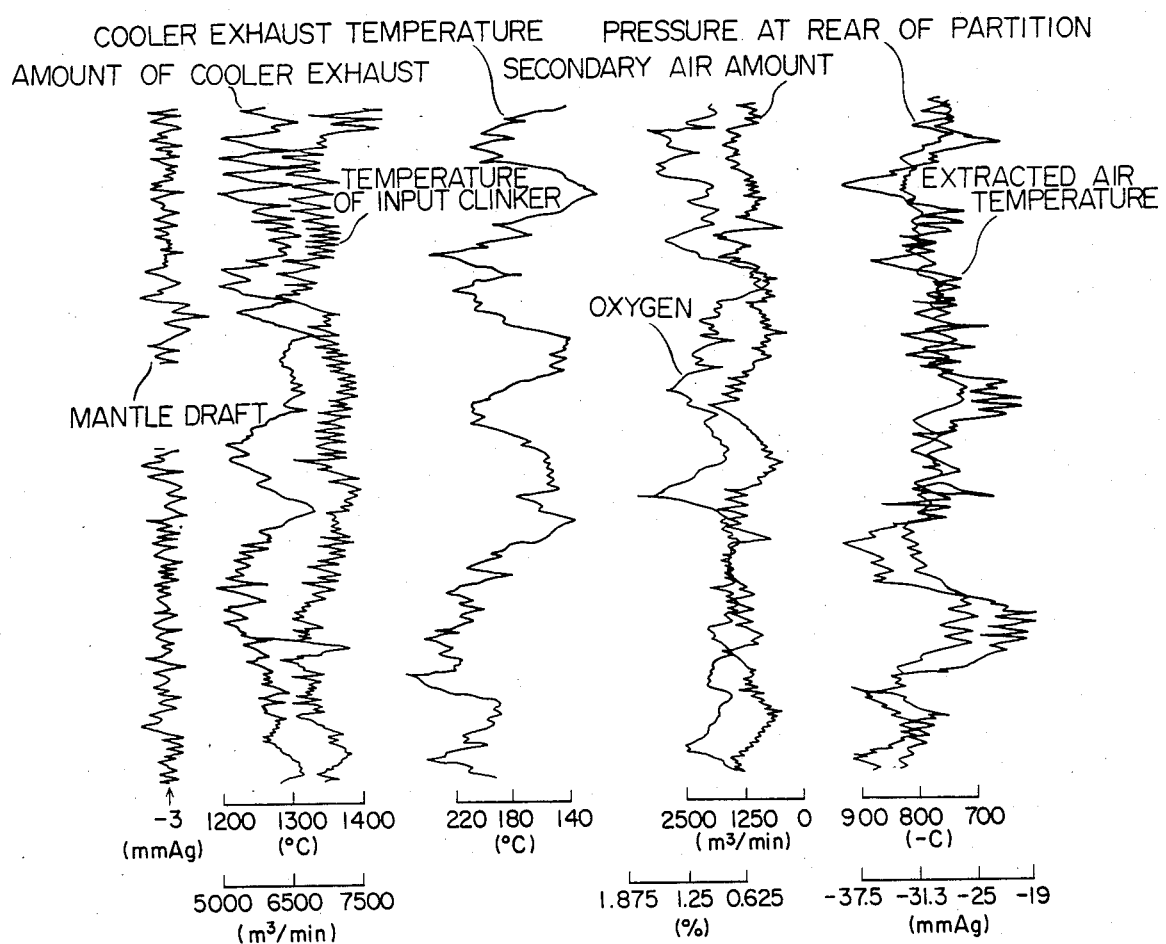
FIG. 4 is a diagram showing the variable states of temperature, pressure and air flow of the sections of the prior-art cooler under control.

The performance of the control according to the present invention and the control according to the prior-art will be compared and studied with reference to FIGS. 3 and 4. In comparing the vibration in the cooler exhaust amount with the alteration in the secondary air flow, the variation according to the present invention in FIG. 3 is much smaller than that according to the prior-art in FIG. 4, and this is based on the advantages as described above that the pressure over the clinker layer in the cooler is controlled twice, i.e., the pressure at the rear side having a fast response velocity is first controlled to be maintained at a constant value to exclude disturbances, and the pressure in the hood of the outlet of the kiln is maintained constant by altering the cooling air flow of the cooler 2.

According to the present invention as described above, the variations in the cooler exhaust amount and the secondary air flow rate occurring in the prior-art control means are reduced to stabilize the steps, to improve the quality of the clinker and to reduce the thermal quantity consumption per unit.

What is claimed is:

1. A method for controlling a clinker cooler for cooling a high temperature clinker supplied from a rotary kiln comprising maintaining the pressure at the rear side of a baffle plate in the cooler constant by varying the air flow flowing through an exhaust fan, and controlling the pressure in a kiln outlet hood by the cooling air of all air chambers of the clinker cooler except the first chamber of the kiln side.

2. A method as claimed in claim 1, wherein the varying of the air flow is carried out by varying the opening of a damper of a cooler exhaust fan.

3. A method as claimed in claim 1, wherein the varying of the air flow is carried out by varying the rotational speed of the cooler exhaust fan.

4. A control apparatus for a clinker cooler having a kiln outlet hood mounted over a series of air chambers arranged along the path of air flow in said hood from a kiln to a cooler exhaust fan kiln further having a baffle mounted therein over said air chambers for cooling a high temperature clinker supplied from a rotary kiln comprising means operably associated with said hood for maintaining the pressure at the rear side of a baffle plate in the cooler constant, and additional means operably associated with said hood for controlling the pressure in a kiln outlet hood by the cooling air of all air chambers of the clinker cooler except the first chamber of the kiln side.

5. A control apparatus as claimed in claim 4, wherein the maintenance of the pressure is carried out by means or varying the opening of a damper of a cooler exhaust fan.

6. A control apparatus as claimed in claim 4, wherein the maintenance of the pressure is carried out by means for varying the rotational speed of the cooler exhaust fan.

* * * * *